US012047543B2

(12) United States Patent
Hsu

(10) Patent No.: US 12,047,543 B2
(45) Date of Patent: Jul. 23, 2024

(54) INFRARED CROPPING OPTICAL MODULE AND SCANNER USING THE SAME

(71) Applicant: AVISION INC., Hsinchu (TW)

(72) Inventor: Bo-Hsiung Hsu, Changhua County (TW)

(*) Notice: Subject to any disclaimer, the term of this patent is extended or adjusted under 35 U.S.C. 154(b) by 0 days.

(21) Appl. No.: 18/366,193

(22) Filed: Aug. 7, 2023

(65) Prior Publication Data
US 2024/0114103 A1 Apr. 4, 2024

(30) Foreign Application Priority Data
Oct. 3, 2022 (TW) .................................. 111137459

(51) Int. Cl.
H04N 1/387 (2006.01)
G02B 5/26 (2006.01)
G02B 6/10 (2006.01)
H04N 1/00 (2006.01)
H04N 5/33 (2023.01)

(52) U.S. Cl.
CPC ............ H04N 1/3873 (2013.01); G02B 5/26 (2013.01); G02B 6/102 (2013.01); H04N 1/00559 (2013.01); H04N 5/33 (2013.01)

(58) Field of Classification Search
CPC .... H04N 1/3873; H04N 1/00559; H04N 5/33; G02B 5/26; G02B 6/102
USPC ........................................................ 358/475
See application file for complete search history.

(56) References Cited

U.S. PATENT DOCUMENTS

| 6,241,069 | B1* | 6/2001 | Mazur ...................... G07D 7/04 |
| | | | 194/207 |
| 7,924,312 | B2* | 4/2011 | Packard .................... G06T 7/38 |
| | | | 348/263 |
| 8,282,222 | B2* | 10/2012 | Smits .................... H04N 9/3194 |
| | | | 353/85 |
| 9,752,925 | B2* | 9/2017 | Chu .......................... G01J 1/44 |
| 11,611,681 | B2* | 3/2023 | Chen .................. H04N 1/02815 |
| 2005/0104089 | A1* | 5/2005 | Engelmann ............ H04N 23/11 |
| | | | 257/E31.046 |
| 2007/0187511 | A1* | 8/2007 | Meffre ...................... G01J 3/50 |
| | | | 235/462.04 |

(Continued)

FOREIGN PATENT DOCUMENTS

CA      3176009 A1   12/2021
TW   202217280 A    5/2022

(Continued)

Primary Examiner — Negussie Worku
(74) Attorney, Agent, or Firm — MUNCY, GEISSLER, OLDS & LOWE, P.C.

(57) ABSTRACT

An infrared cropping optical module includes: a housing; a linear optical sensing module, which is accommodated within the housing, outputs visible light and receives reflected visible light and transmitting infrared light to obtain a visible light image, generated after the linear optical sensing module scans a medium, and cropping information corresponding to the visible light image; an infrared linear light source, which is accommodated within the housing, is disposed on one side of the linear optical sensing module, and outputs first infrared light; and a calibration sheet, which is disposed on an optical path of the first infrared light and reflects external visible light. A scanner using the infrared cropping optical module for image cropping is also disclosed.

11 Claims, 7 Drawing Sheets

(56) References Cited

U.S. PATENT DOCUMENTS

| | | | |
|---|---|---|---|
| 2014/0362052 A1* | 12/2014 | McCaughan | G06F 3/0426 345/175 |
| 2017/0180587 A1* | 6/2017 | Wilsher | H04N 1/00013 |
| 2018/0081317 A1* | 3/2018 | Kasuga | G03G 15/6582 |
| 2020/0045809 A1* | 2/2020 | Liao | H01R 13/6461 |
| 2020/0106929 A1* | 4/2020 | Doyle | H04N 3/08 |
| 2022/0124204 A1* | 4/2022 | Chen | H04N 1/00087 |
| 2022/0124211 A1* | 4/2022 | Chen | H04N 1/00087 |

FOREIGN PATENT DOCUMENTS

| | | |
|---|---|---|
| TW | 202218402 A | 5/2022 |
| WO | WO2005088265 A1 | 9/2005 |

* cited by examiner

INFRARED CROPPING OPTICAL MODULE AND SCANNER USING THE SAME

CROSS-REFERENCE TO RELATED APPLICATIONS

This application claims priority of No. 11137459 filed in Taiwan R.O.C. on Oct. 3, 2022 under 35 USC 119, the entire content of which is hereby incorporated by reference.

FIELD OF THE INVENTION

This disclosure relates to an optical module and a scanner using the same, and more particularly to an infrared cropping optical module and a scanner using the same, wherein a calibration sheet is used in conjunction with infrared light to provide brightness calibrating and cropping information for document scanning.

DESCRIPTION OF RELATED ART

At present, when a scanner is scanning a document or a medium, a user can preview an image thereof and then set the boundary according to the previewed image. However, different types of documents may have different boundaries and different holes. Therefore, these boundaries or holes need to be defined, and the scanner needs to provide the image and cropping information concurrently.

In a conventional method, a black, white or gray background, or a glass plate with a coating layer is used as the background, and cropping information is generated according to the difference between the document and the background, so that the boundary information of the document is obtained. However, when the glass plate is used as the background, poor cropping may occur for the document having holes or an irregular boundary. When the black background is used, indirect cropping information may be provided for the document having black texts on the white background, and cropping may be performed according to the color difference between the black background and the document. However, when the black background is used, the standard white calibration cannot be performed on an optical scanning module, such as a charge-coupled device (CCD) type image sensor or a contact image sensor (CIS) scanning module. When the white background is used, the standard white calibration can be performed, but certain limitations are present for the cropping of the document having black texts on the white background. Thus, various document cropping requirements cannot be satisfied.

In addition, these optical modules need to work in conjunction with additional background sheets and calibration sheets to achieve the desired functions. It is time-consuming to assemble the optical module, the background sheet and the calibration sheet onto the machine, and assembly errors may present to cause scan errors. More particularly, it is more complicated to assemble the machine with the duplex scan function. It is a problem to be solved by providing the optical module, which can be easily assembled, has the modular design and is capable of providing the cropping information.

SUMMARY OF THE INVENTION

It is therefore an objective of this disclosure to provide an infrared cropping optical module and a scanner using the infrared cropping optical module, which can provide cropping information and further has an integrated configuration for the mass production, cost reduction and convenient assembling.

To achieve the above-identified objective, this disclosure provides an infrared cropping optical module including: a housing; a linear optical sensing module, which is accommodated within the housing, outputs visible light, and receives reflected visible light and transmitting infrared light to obtain a visible light image, generated after the linear optical sensing module scans a medium, and cropping information corresponding to the visible light image; an infrared linear light source, which is accommodated within the housing, is disposed on one side of the linear optical sensing module, and outputs first infrared light; and a calibration sheet, which is disposed on an optical path of the first infrared light, and reflects external visible light. In one example, a second infrared cropping optical module performs the calibration based on the calibration sheet, and receives the first infrared light transmitting through the calibration sheet to obtain a second visible light image, generated after the second infrared cropping optical module scans the medium, and second cropping information corresponding to the second visible light image to facilitate image cropping.

This disclosure also provides a scanner including a first infrared cropping optical module and a second infrared cropping optical module disposed opposite each other. The first infrared cropping optical module outputs first visible light and first infrared light, receives first reflected visible light and first transmitting infrared light, and includes a first calibration sheet disposed on an optical path of the first infrared light. The second infrared cropping optical module outputs second visible light and second infrared light, receives second reflected visible light and second transmitting infrared light, and includes a second calibration sheet disposed on an optical path of the second infrared light. The first visible light illuminates and is reflected by the second calibration sheet or a medium to generate the first reflected visible light. The second infrared light transmits through the second calibration sheet and the medium to generate the first transmitting infrared light. The second visible light illuminates and is reflected by the first calibration sheet or the medium to generate the second reflected visible light. The first infrared light transmits through the first calibration sheet and the medium to generate the second transmitting infrared light.

The infrared cropping optical module and the scanner according to the above-mentioned embodiment can provide the visible light image data and the corresponding cropping information, and no poor cropping effect is present when the medium having holes or the medium having an irregular boundary is scanned. In addition, a light guide, a housing and the linear optical sensing module are integrated into one modular kit, which is beneficial to the mass production and the cost reduction, and is convenient to the subsequent assembly, maintenance and replacement. Furthermore, because the modular kit may be produced in a mass production manner to reduce the cost, the modular kit can be used as a general component.

In order to make the above-mentioned content of this disclosure more obvious and be easily understood, preferred embodiments will be described in detail as follows in conjunction with the accompanying drawings.

DETAILED DESCRIPTION OF THE INVENTION

In this disclosure, a calibration sheet is mainly used in conjunction with an infrared light source, a visible light source and an image sensor to form an integral infrared cropping optical module, so that a visible light image, and cropping information corresponding to the visible light image can be provided when a document or a medium is being scanned, wherein two infrared cropping optical modules can be assembled to form a duplex scanner, and the very good effect can be obtained upon assembling and cost controlling.

Figure 1:
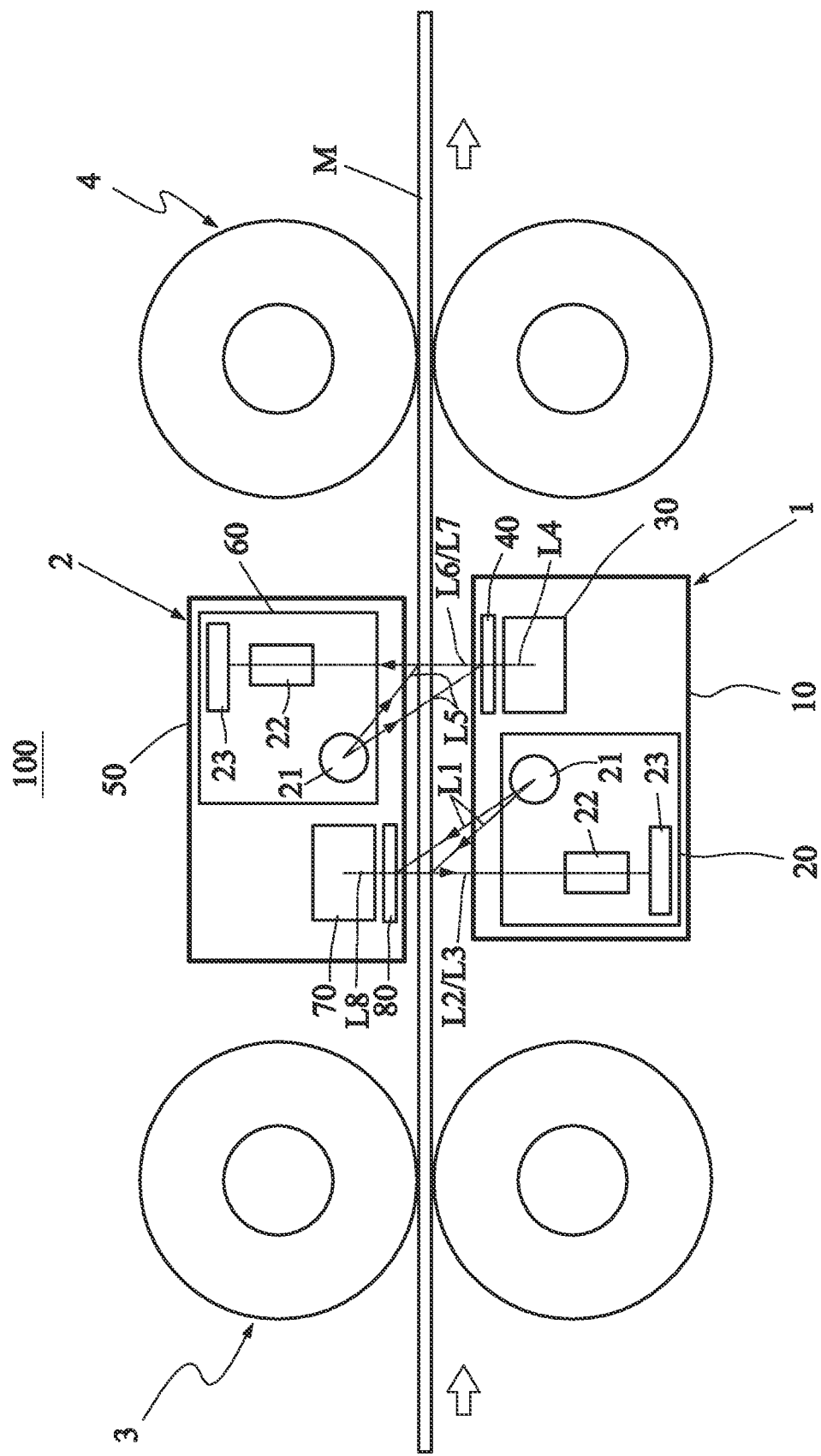
FIG. 1 is a schematic view showing a scanner according to a preferred embodiment of this disclosure.

FIG. 1 is a schematic view showing a scanner 100 according to the preferred embodiment of this disclosure Referring to FIG. 1, the scanner 100 includes a first infrared cropping optical module 1 and a second infrared cropping optical module 2 disposed opposite each other, wherein each infrared cropping optical module has a modular structure, and can be easily positioned at and assembled onto or into a main housing (not shown) of the scanner 100. In this embodiment, the scanner 100 may further include an input roller set 3 and an output roller set 4, each of which transports a medium M using rollers. The first infrared cropping optical module 1 and the second infrared cropping optical module 2 are disposed between the input roller set 3 and the output roller set 4. In other embodiments, the first infrared cropping optical module 1 and the second infrared cropping optical module 2 can be driven by a driving mechanism to perform flatbed duplex scanning.

The first infrared cropping optical module 1 outputs first visible light L1 and first infrared light L4, receives first reflected visible light L2 and first transmitting infrared light L3, and includes a first calibration sheet 40 disposed on an optical path of the first infrared light L4. The first infrared light L4 may transmit through the first calibration sheet 40. In a non-restrictive example, the first infrared cropping optical module 1 further includes a first housing 10, a first linear optical sensing module 20 and a first infrared linear light source 30. In one example, the linear shape may be a straight-line shape or a longitudinal shape. The first housing 10 in this embodiment is a seat or a base. The first linear optical sensing module 20 is accommodated within the first housing 10, outputs the first visible light L1, and receives the first reflected visible light L2 and the first transmitting infrared light L3. The first infrared linear light source 30 is accommodated within the first housing 10, outputs the first infrared light L4, and is disposed on one side of the first linear optical sensing module 20. In one example, the first linear optical sensing module 20 may be a CIS or CCD optical sensing module, and the first infrared linear light source 30 may be implemented by an infrared light emitting diode (LED) working in conjunction with a light guide. The first housing 10 may be designed to accommodate and position the first linear optical sensing module 20 and the first infrared linear light source 30, while the first calibration sheet 40 may be attached to the first infrared linear light source 30 to cover the first infrared linear light source 30. Taking the CIS optical sensing module as an example to be explained, the first linear optical sensing module 20 includes a visible light source 21, a lens array 22 and a sensing member array 23. The visible light source 21 may be implemented by a visible LED working in conjunction with the light guide. The sensing member array 23 may sense visible light and infrared light.

Similarly, the second infrared cropping optical module 2 outputs second visible light L5 and second infrared light L8, receives second reflected visible light L6 (may also be defined as external visible light) and second transmitting infrared light L7, and includes a second calibration sheet 80 disposed on an optical path of the second infrared light L8, wherein the second infrared light L8 transmits through the second calibration sheet 80. In a non-restrictive example, second infrared cropping optical module 2 further includes a second housing 50, a second linear optical sensing module 60 and a second infrared linear light source 70. The second linear optical sensing module 60 is accommodated within the second housing 50, outputs the second visible light L5, and receives the second reflected visible light L6 and the second transmitting infrared light L7. The second infrared linear light source 70 is accommodated within the second housing 50, outputs the second infrared light L8, and is deposed on one side of the second linear optical sensing module 60. In one example, the structure of the second infrared cropping optical module 2 may be the same as that of the first infrared cropping optical module 1.

When image scanning of a bottom surface of the medium M is being performed, the first visible light L1 illuminates and is reflected by the second calibration sheet 80 or the medium M to generate the first reflected visible light L2. The first infrared cropping optical module 1 performs calibration based on the second calibration sheet 80. The first reflected visible light L2 reflected by the second calibration sheet 80 is received by the first linear optical sensing module 20 to obtain standard-white calibration information. The first reflected visible light L2 reflected by the medium M is received by the first linear optical sensing module 20 to obtain the visible light image data of the medium M, which may be calibrated according to the standard-white calibration information. The second infrared light L8 transmits through the second calibration sheet 80 and the medium M to generate the first transmitting infrared light L3, so that the first linear optical sensing module 20 can obtain cropping information corresponding to a boundary of the medium M. Therefore, the first linear optical sensing module 20 receives the first reflected visible light L2 and the first transmitting infrared light L3 to obtain a first visible light image, generated after the first infrared cropping optical module 1 scans the medium M, and first cropping information corresponding to the first visible light image.

When image scanning of a top surface of the medium M is being performed, the second visible light L5 illuminates and is reflected by the first calibration sheet 40 or the medium M to generate the second reflected visible light L6. The second infrared cropping optical module 2 performs calibration based on the first calibration sheet 40. The second reflected visible light L6 reflected by the first calibration sheet 40 is received by the second linear optical sensing module 60 to obtain standard-white calibration information. The second reflected visible light L6 reflected by the medium M is received by the second linear optical sensing module 60 to obtain the visible light image data of the medium M. The first infrared light L4 transmits through the first calibration sheet 40 and the medium M to generate the second transmitting infrared light L7, so that the second linear optical sensing module 60 obtains cropping information corresponding to the boundary of the medium M. Therefore, the second linear optical sensing module 60 receives the second reflected visible light L6 and the second transmitting infrared light L7 to obtain a second visible light image, generated after the second infrared cropping optical module 2 scans the medium M, and second cropping information corresponding to the second visible light image.

One example of the first infrared cropping optical module 1 will be described in the following. The configuration or structure of the second infrared cropping optical module 2 may be the same as that of the first infrared cropping optical module 1, so detailed descriptions thereof will be omitted.

Figure 2:
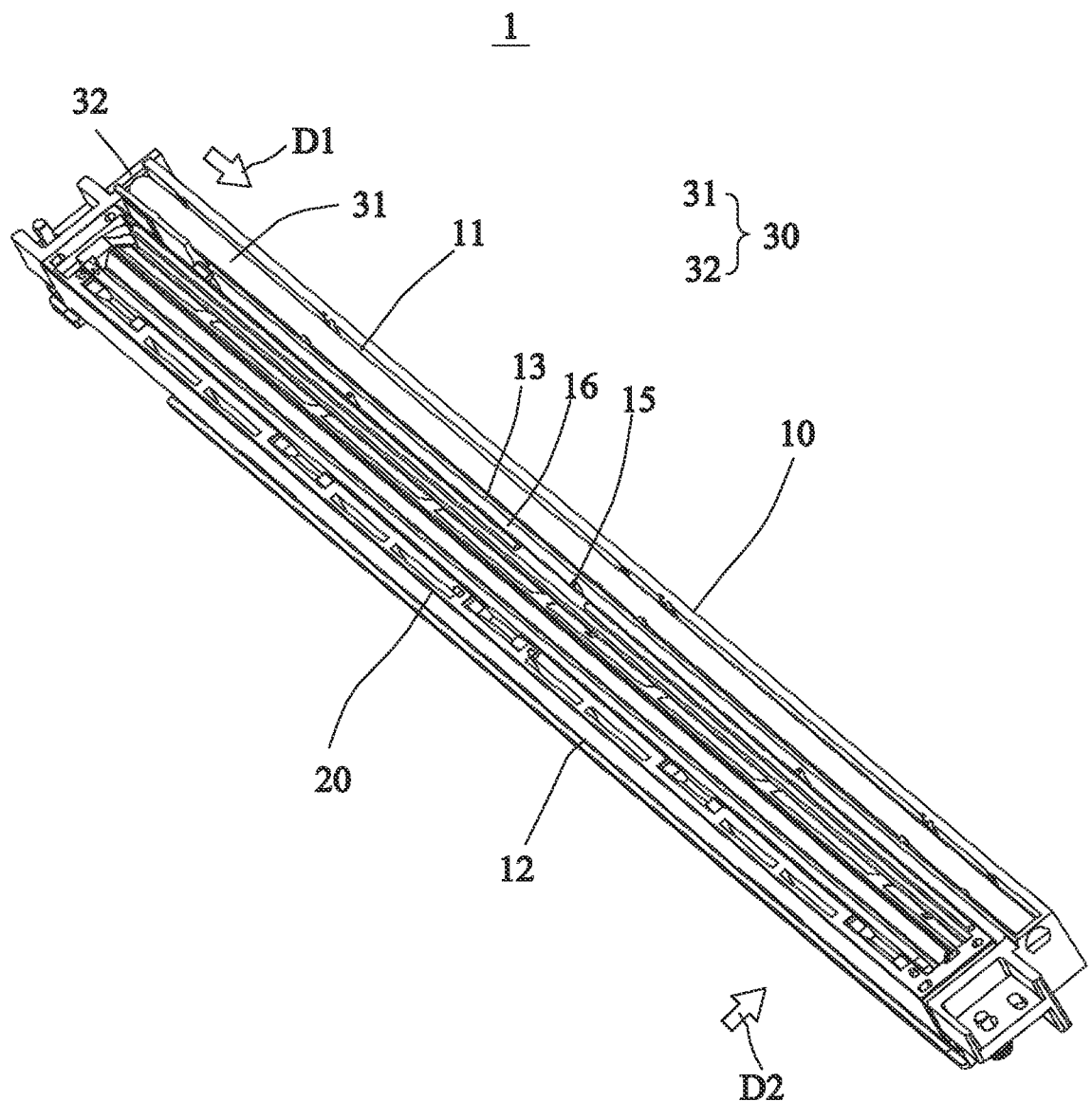
FIG. 2 is a pictorially assembled view showing a first infrared cropping optical module of FIG. 1.
Figure 3:
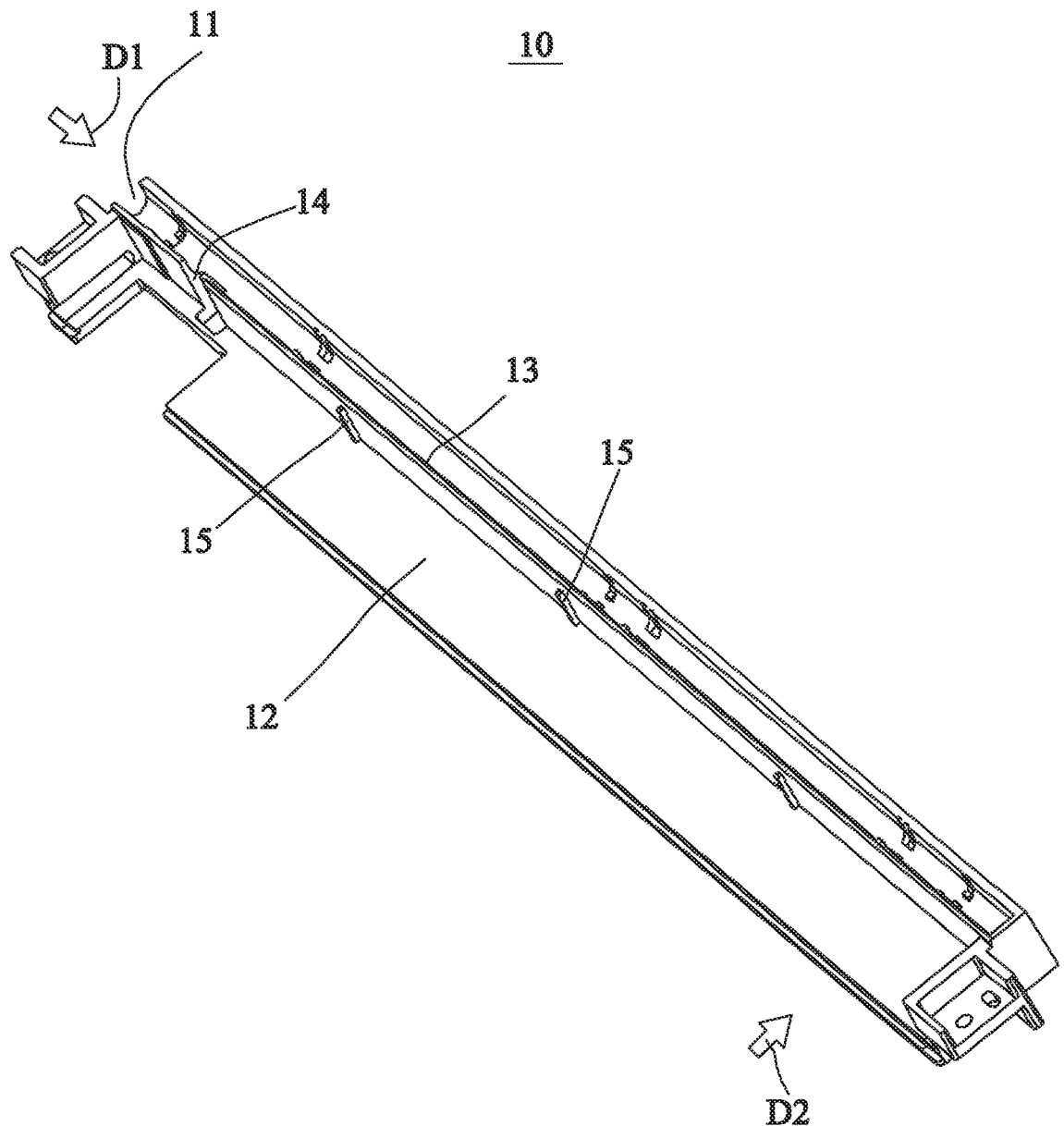
FIG. 3 is a pictorial view showing a first housing of FIG. 2.
Figure 4:
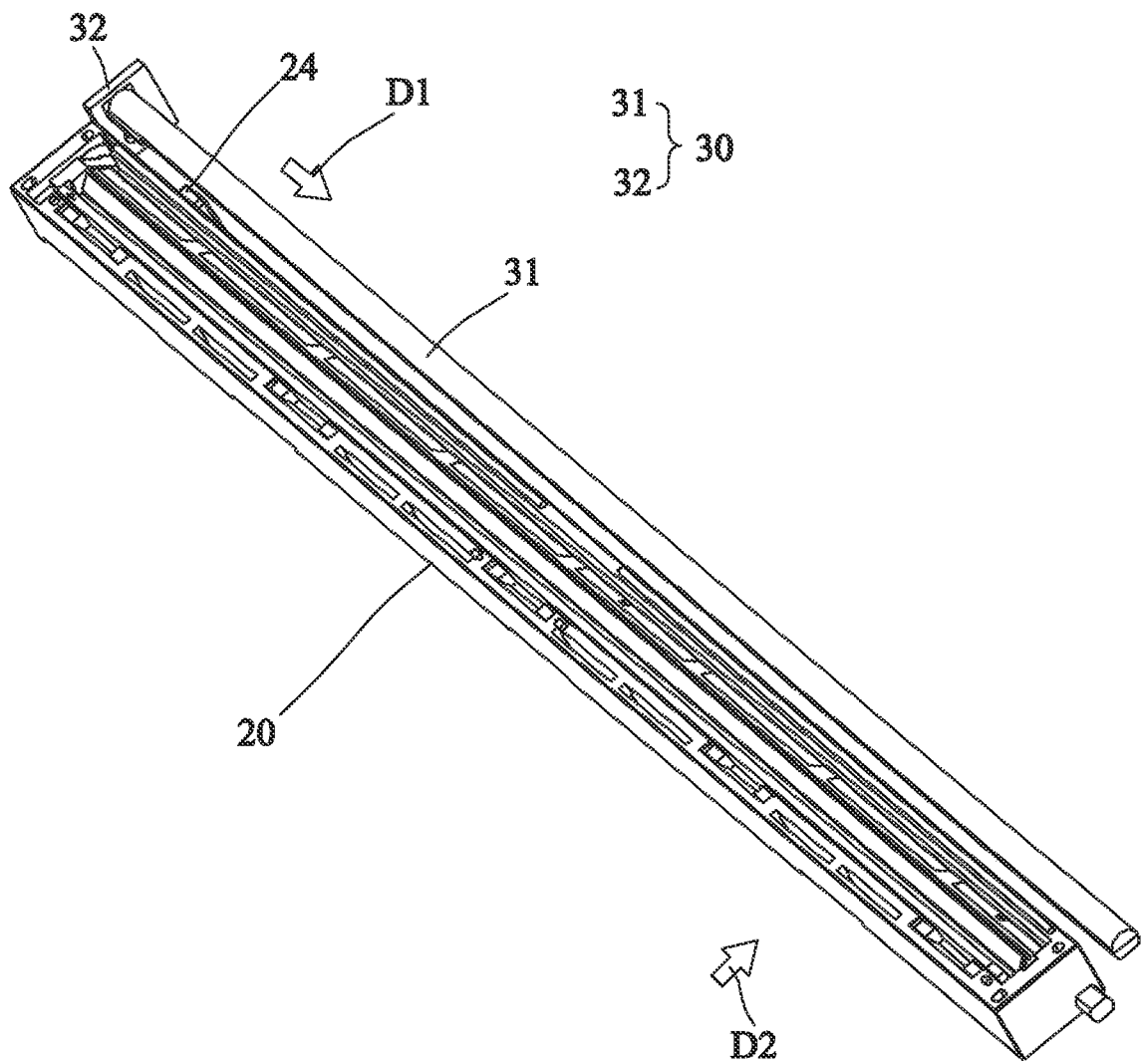
FIG. 4 is a pictorial view showing a first linear optical sensing module and a first infrared linear light source of FIG. 2.
Figure 5:
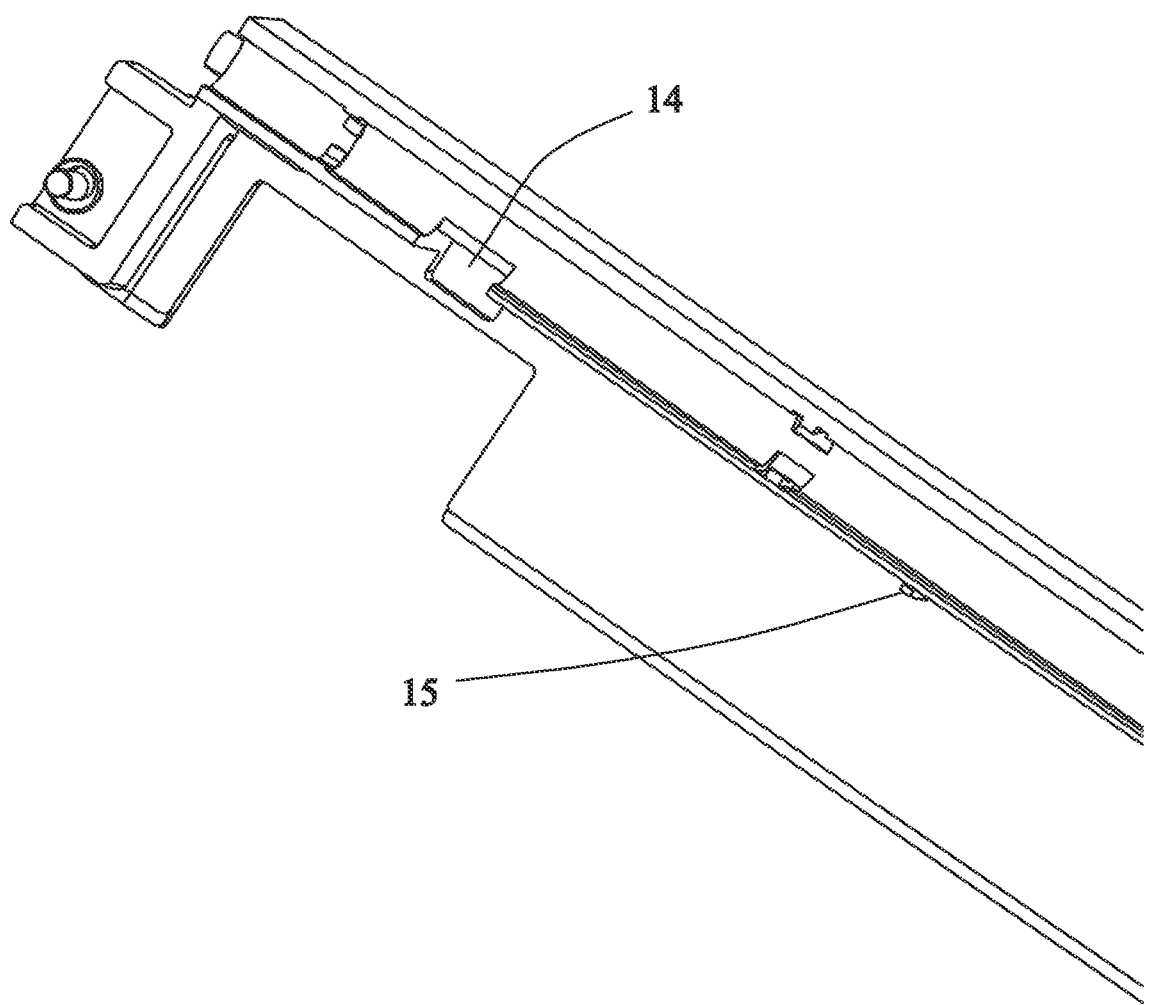
FIG. 5 is a partial pictorial view showing the first housing of FIG. 2.

FIG. 2 is a pictorially assembled view showing the first infrared cropping optical module of FIG. 1. FIG. 3 is a pictorial view showing the first housing of FIG. 2. FIG. 4 is a pictorial view showing the first linear optical sensing module and the first infrared linear light source of FIG. 2. FIG. 5 is a partial pictorial view showing the first housing of FIG. 2. Referring to FIGS. 1 to 5, the first housing 10 in the first infrared cropping optical module 1 has a first slot 11 and a second slot 12, and the first infrared linear light source 30 includes an infrared light source 32 and a light guide 31. The light guide 31 is disposed in the first slot 11, and the first linear optical sensing module 20 is disposed in the second slot 12. The infrared light source 32 is disposed on one side of the light guide 31. The infrared light source 32, such as the LED, is disposed on a circuit board.

The light guide 31 is installed into the first slot 11 in a first direction D1, the first linear optical sensing module 20 is installed into the second slot 12 in a second direction D2, and the first direction D1 is substantially perpendicular to the second direction D2. Thus, the light guide 31 and the first linear optical sensing module 20 may be assembled concurrently to save the time.

In one example, the first slot 11 is a light concentrating slot or groove for concentrating the first infrared light L4, outputted or diverged from the light guide 31, back into the light guide 31. The surface of the light concentrating slot may be specially treated, such as smoothened or coated with a reflective material, to improve the reflective efficiency, decrease the current of the LED and reduce the generated heat. Optionally, the light concentrating slot and the light guide 31 may be designed to focus the infrared light onto the lens array 22 of the opposite second linear optical sensing module 60 to enhance the output intensity of the infrared light.

In addition, a partition wall 13 between the first slot 11 and the second slot 12 may have a positioning slot 14, so that a positioning structure 24 of the first linear optical sensing module 20 (FIG. 4) and the positioning slot 14 are interpositioned with each other.

Figure 6:
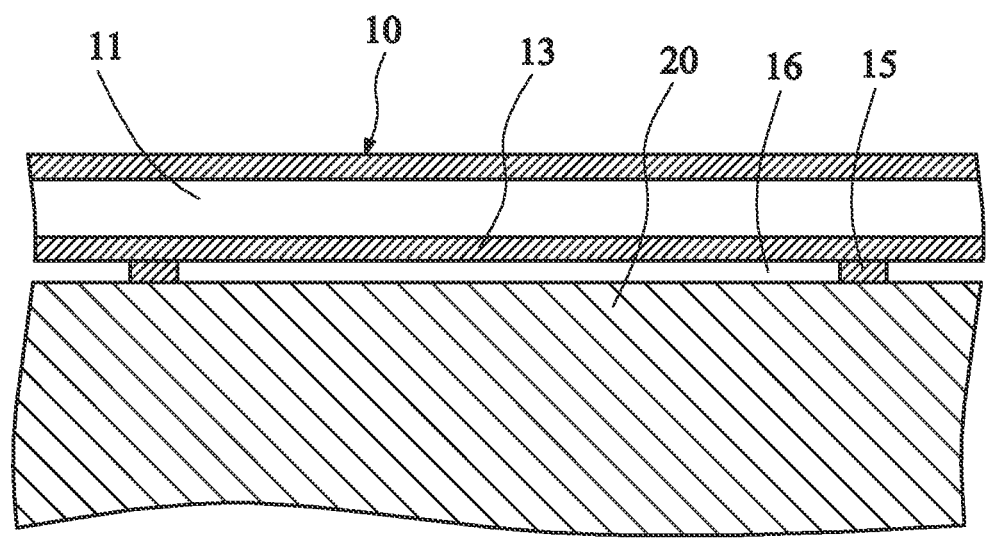
FIG. 6 is a schematic view showing the first linear optical sensing module and the first housing.

FIG. 6 is a schematic view showing the first linear optical sensing module and the first housing. Referring to FIGS. 6, 2 and 3, the partition wall 13 between the first slot 11 and the second slot 12 may have ribs 15, so that heat dissipating spaces 16 are formed between the first linear optical sensing module 20 and the partition wall 13. Thus, the ribs 15 can provide the effects of positioning and heat dissipating.

Figure 7:
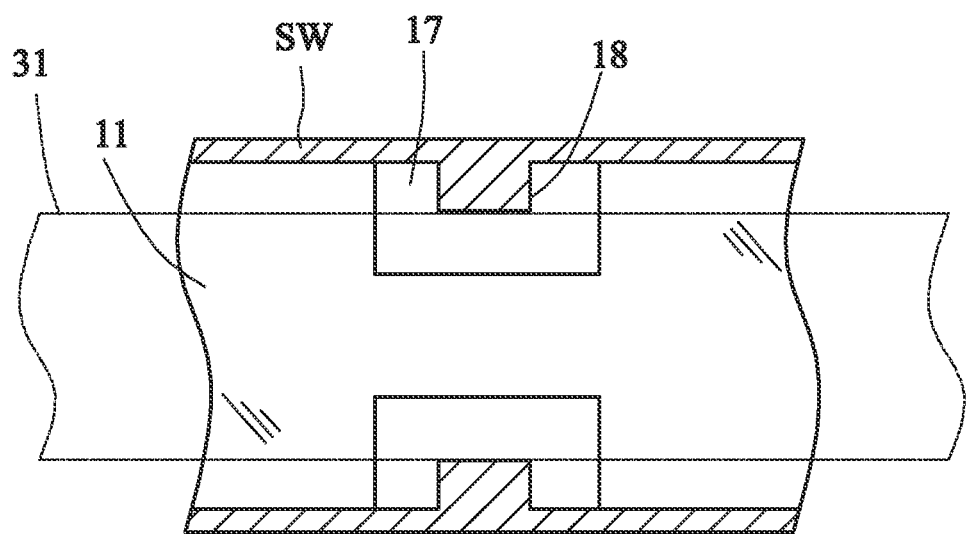
FIG. 7 is a schematic view showing a light guide and a positioning rib.
Figure 8:
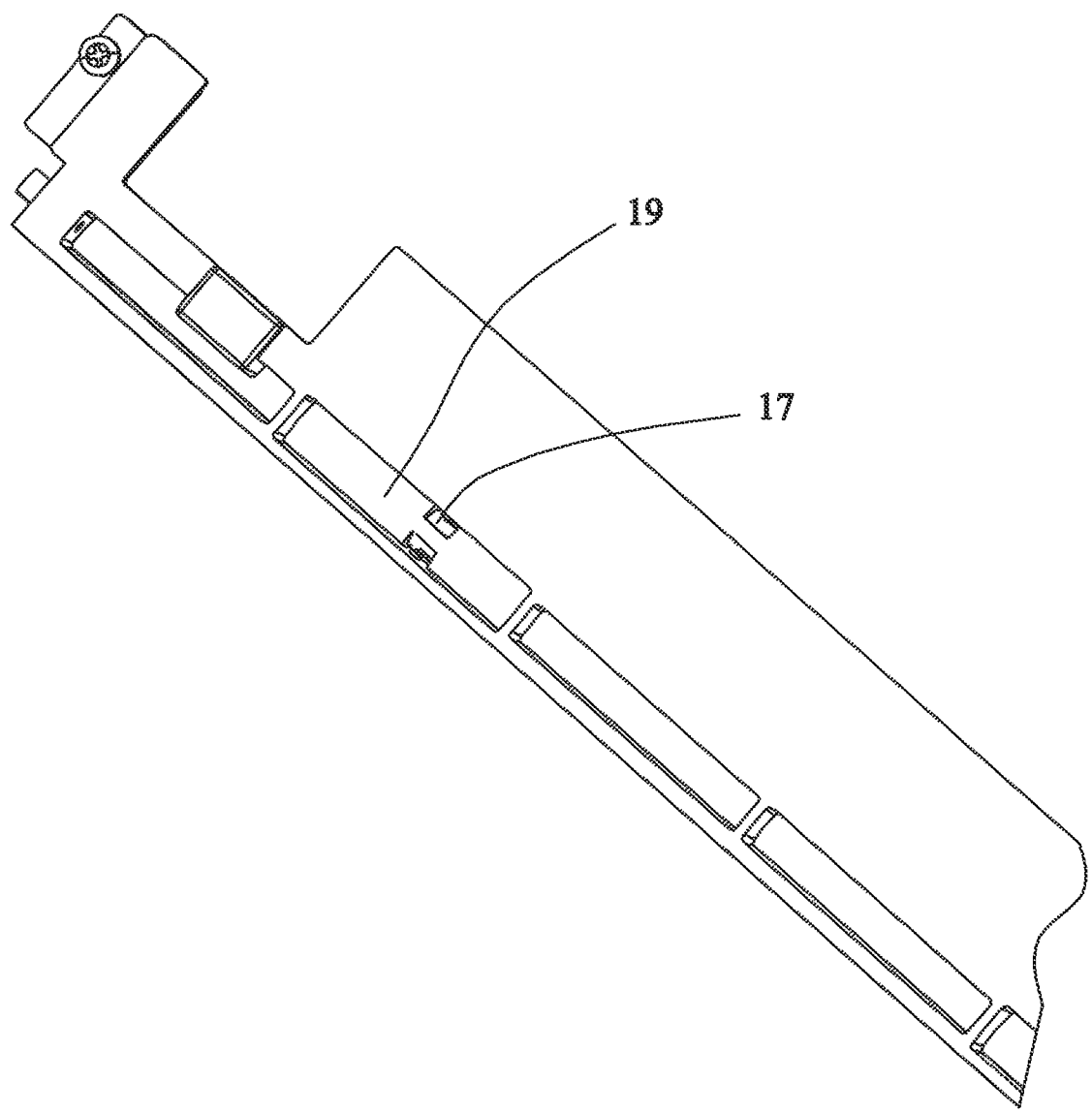
FIG. 8 is a schematic view showing the first housing at another viewing angle.

FIG. 7 is a schematic view showing the light guide and the positioning rib. FIG. 8 is a schematic view showing the first housing at another viewing angle. Referring to FIGS. 7 and 8, a structure wall SW of the first slot 11 has vents 17 and positioning ribs 18 disposed in the vents 17. The positioning ribs 18 fix the light guide 31, and the vents 17 penetrate through the structure wall SW and communicate with concavities 19 on a backside of the first housing 10 to provide a heat dissipating function. The concavities 19 of the first housing 10 are designed such that the material can be saved and the heat dissipating function can be provided.

Compared with the optical module having the glass plate with the coating layer, as well as the scanner using the same, the infrared cropping optical module of the embodiment can provide the visible light image data and the corresponding cropping information, and eliminate the poor cropping effect for the medium having the hole(s) or the medium having the irregular boundary. In addition, the light guide, the housing and the linear optical sensing module are integrated into one modular kit, and this is beneficial to the mass production and cost reduction, and is convenient to the subsequent assembling, maintenance and replacement. Furthermore, because the modular kit may be produced in a mass production manner to reduce the cost, the modular kit can be used as a general component. For example, the modular kit designed to be used in the duplex scanner may also be used in the simplex scanner.

The specific embodiments proposed in the detailed description of this disclosure are only used to facilitate the description of the technical contents of this disclosure, and do not narrowly limit this disclosure to the above-mentioned embodiments. Various changes of implementations made without departing from the spirit of this disclosure and the scope of the claims are deemed as falling within the following claims.

The invention claimed is:

1. An infrared cropping optical module, comprising:
a housing;
a linear optical sensing module, which is accommodated within the housing, outputs visible light, and receives reflected visible light and transmitting infrared light to obtain a visible light image, generated after the linear optical sensing module scans a medium, and cropping information corresponding to the visible light image;
an infrared linear light source, which is accommodated within the housing, is disposed on one side of the linear optical sensing module, and outputs first infrared light; and
a calibration sheet, which is disposed on an optical path of the first infrared light, and reflects external visible light, wherein a second infrared cropping optical module performs calibration based on the calibration sheet, and receives the first infrared light transmitting through the calibration sheet to obtain a second visible light image, generated after the second infrared cropping optical module scans the medium, and second cropping information corresponding to the second visible light image.

2. The infrared cropping optical module according to claim 1, wherein the housing has a first slot and a second slot, a light guide of the infrared linear light source is disposed in the first slot, and the linear optical sensing module is disposed in the second slot.

3. The infrared cropping optical module according to claim 2, wherein the light guide is installed into the first slot in a first direction, the linear optical sensing module is installed into the second slot in a second direction, and the first direction is substantially perpendicular to the second direction.

4. The infrared cropping optical module according to claim 2, wherein the first slot is a light concentrating slot, which concentrates the first infrared light, outputted from the light guide, back into the light guide.

5. The infrared cropping optical module according to claim 2, wherein a partition wall between the first slot and the second slot has a positioning slot, so that a positioning structure of the linear optical sensing module and the positioning slot are inter-positioned with each other.

6. The infrared cropping optical module according to claim 2, wherein a partition wall between the first slot and the second slot has ribs, so that heat dissipating spaces are formed between the linear optical sensing module and the partition wall.

7. The infrared cropping optical module according to claim 2, wherein a structure wall of the first slot has vents and positioning ribs disposed in the vents, the positioning ribs fix the light guide, the vents penetrate through the structure wall and communicate with concavities on a backside of the housing to provide a heat dissipating function.

8. A scanner, comprising a first infrared cropping optical module and a second infrared cropping optical module disposed opposite each other, wherein:
the first infrared cropping optical module outputs first visible light and first infrared light, receives first reflected visible light and first transmitting infrared light, and comprises a first calibration sheet disposed on an optical path of the first infrared light; and
the second infrared cropping optical module outputs second visible light and second infrared light, receives second reflected visible light and second transmitting infrared light, and comprises a second calibration sheet disposed on an optical path of the second infrared light, wherein:
the first visible light illuminates and is reflected by the second calibration sheet or a medium to generate the first reflected visible light;
the second infrared light transmits through the second calibration sheet and the medium to generate the first transmitting infrared light;
the second visible light illuminates and is reflected by the first calibration sheet or the medium to generate the second reflected visible light; and
the first infrared light transmits through the first calibration sheet and the medium to generate the second transmitting infrared light.

9. The scanner according to claim 8, wherein:
the first infrared cropping optical module further comprises: a first housing; a first linear optical sensing module, which is accommodated within the first housing, outputs the first visible light, and receives the first reflected visible light and the first transmitting infrared light; and a first infrared linear light source, which is accommodated within the first housing, outputs the first infrared light, and is disposed on one side of the first linear optical sensing module; and
the second infrared cropping optical module further comprises: a second housing; a second linear optical sensing module, which is accommodated within the second housing, outputs the second visible light, and receives the second reflected visible light and the second transmitting infrared light; and a second infrared linear light source, which is accommodated within the second housing, outputs the second infrared light, and is disposed on one side of the second linear optical sensing module.

10. The scanner according to claim 9, wherein the first linear optical sensing module receives the first reflected visible light and the first transmitting infrared light to obtain a first visible light image, generated after the first infrared cropping optical module scans the medium, and first cropping information corresponding to the first visible light image, and the second linear optical sensing module receives the second reflected visible light and the second transmitting infrared light to obtain a second visible light image, generated after the second infrared cropping optical module scans the medium, and second cropping information corresponding to the second visible light image.

11. The scanner according to claim 8, further comprising:
an input roller set and an output roller set for transporting the medium, wherein the first infrared cropping optical module and the second infrared cropping optical module are disposed between the input roller set and the output roller set.

\* \* \* \* \*

UNITED STATES PATENT AND TRADEMARK OFFICE
CERTIFICATE OF CORRECTION

| | | |
|---|---|---|
| PATENT NO. | : 12,047,543 B2 | Page 1 of 1 |
| APPLICATION NO. | : 18/366193 | |
| DATED | : July 23, 2024 | |
| INVENTOR(S) | : Bo-Hsiung Hsu | |

It is certified that error appears in the above-identified patent and that said Letters Patent is hereby corrected as shown below:

On the Title Page

Item (73), insert:
-- (73) Assignee: AVISION INC., Hsinchu (TW) --

Signed and Sealed this
Seventeenth Day of September, 2024

Katherine Kelly Vidal
*Director of the United States Patent and Trademark Office*